(12) United States Patent
Van Swam

(10) Patent No.: US 6,319,339 B1
(45) Date of Patent: Nov. 20, 2001

(54) HIGH STRENGTH ZIRCONIUM ALLOYS CONTAINING BISMUTH

(75) Inventor: Leonard F. P. Van Swam, Richland, WA (US)

(73) Assignee: Framatome ANP Inc., Lynchburg, VA (US)

( * ) Notice: Subject to any disclaimer, the term of this patent is extended or adjusted under 35 U.S.C. 154(b) by 0 days.

(21) Appl. No.: 09/054,760

(22) Filed: Apr. 3, 1998

Related U.S. Application Data

(62) Division of application No. 08/823,941, filed on Mar. 25, 1997, now Pat. No. 5,772,798.

(51) Int. Cl.[7] .................................................. C22C 14/00
(52) U.S. Cl. ........................................... 148/421; 420/422
(58) Field of Search .............................. 148/421; 420/422, 420/423

(56) References Cited

U.S. PATENT DOCUMENTS

| 4,735,768 | 4/1988 | Stehle et al. | 376/417 |
| 4,876,064 | 10/1989 | Taylor | 420/422 |
| 4,963,316 | 10/1990 | Stehle et al. | 376/416 |
| 5,024,809 | 6/1991 | Taylor | 376/417 |
| 5,026,516 | 6/1991 | Taylor | 376/416 |
| 5,176,762 | * 1/1993 | Berczik | 148/407 |
| 5,493,592 | 2/1996 | Garzarolli et al. | 376/416 |
| 5,596,615 | * 1/1997 | Nakamura et al. | 376/438 |

FOREIGN PATENT DOCUMENTS 287 889  10/1988 (EP) .

OTHER PUBLICATIONS

Williams, C.D, et al., Development of High Strength Zirconium Alloys, Canadian Metallurgical Quarterly, vol. 11, No. 1, pp. 257–271, 1972.

European Search Report dated May 26, 1998 in European Patent Application relating to present U.S. Application.

* cited by examiner

Primary Examiner—John Sheehan
(74) Attorney, Agent, or Firm—Kenyon & Kenyon

(57) ABSTRACT

High strength zirconium alloys with improved strength and creep resistance having 1.5 to 6 weight percent bismuth and an element or mixtures of elements selected from the group of molybdenum, tin and niobium.

12 Claims, 2 Drawing Sheets

HIGH STRENGTH ZIRCONIUM ALLOYS CONTAINING BISMUTH

This is a divisional of application Ser. No. 08/823,941 filed Mar. 25,1997 now U.S. Pat. No. 5,772,798.

FIELD OF THE INVENTION

The present invention relates to zirconium based alloys suitable for use in nuclear reactors, and more particularly for use in the cladding of nuclear fuel elements used in nuclear fuel assemblies for pressurized water reactors.

BACKGROUND OF THE INVENTION

Cladding for use in nuclear fuel rods for light water reactors functions to prevent fission products from being released from the fuel into the coolant/moderator and to prevent contact and chemical reactions between the fuel and the coolant/moderator. The cladding is required to have excellent mechanical properties and high corrosion resistance in the environment and for the conditions expected during reactor operations. Cladding is therefore required to have adequate corrosion resistance for the lifetime of the fuel rod for operation in steam and water at temperatures up to approximately 345° C., adequate strength and creep behavior over the lifetime of the fuel rod, and typically have low parasitic neutron absorption for economic use of the fissionable fuel material.

Common cladding materials include zirconium, zirconium alloys, and stainless steel. Zirconium based alloys in which the major component is zirconium have been used in the cladding of nuclear fuel rods or elements for several decades. Two of the most commonly used zirconium alloys that have given satisfactory performance are zircaloy 2 and Zircaloy 4 and are described in American Society for Testing and Materials standard B350-93(1993), Standard Specification For zirconium and Zirconium Alloy Ingots For Nuclear Application, compositions R60802 and R60804, respectively. Zircaloy 2 (composition R60802) is composed of from 1.20 to 1.70 weight percent tin, 0.07 to 0.20 weight percent iron, 0.05 to 0.15 weight percent chromium, 0.03 to 0.08 weight percent nickel, where the iron plus chromium plus nickel content is from 0.18 to 0.38 weight percent, and the balance is zirconium plus impurities. Zircaloy 4 (composition R60804) is composed of from 1.20 to 1.70 weight percent tin, 0.18 to 0.24 weight percent iron, 0.07 to 0.13 weight percent chromium, where the iron plus chromium content is 0.28 to 0.37 weight percent, and the balance is zirconium plus impurities. The maximum impurities for Zircaloy 2 and Zircaloy 4 are given in the following table which is from Table 1 of the ASTM B350-93 Standard.

TABLE I

| MAXIMUM IMPURITIES WEIGHT % | | |
|---|---|---|
|  | R 60802 | R 60804 |
| Aluminum | 0.0075 | 0.0075 |
| Boron | 0.00005 | 0.00005 |
| Cadmium | 0.00005 | 0.00005 |
| Carbon | 0.027 | 0.027 |
| Cobalt | 0.0020 | 0.0020 |
| Copper | 0.0050 | 0.0050 |
| Hafnium | 0.010 | 0.010 |
| Hydrogen | 0.0025 | 0.0025 |
| Oxygen | * | * |
| Magnesium | 0.0020 | 0.0020 |

TABLE I-continued

| MAXIMUM IMPURITIES WEIGHT % | | |
|---|---|---|
|  | R 60802 | R 60804 |
| Manganese | 0.0050 | 0.0050 |
| Molybdenum | 0.0050 | 0.0050 |
| Nickel | — | 0.0070 |
| Niobium | 0.010 | 0.010 |
| Nitrogen | 0.0065 | 0.0065 |
| Silicon | 0.012 | 0.0120 |
| Tin | — | — |
| Titanium | 0.0050 | 0.0050 |
| Tungsten | 0.010 | 0.010 |
| Uranium (Total) | 0.00035 | 0.00035 |

Although these and other alloys have provided generally adequate performance, they possess some deficiencies that have prompted further analysis and research to find alternative materials for and alternative constructions of nuclear fuel rod cladding to single walled cladding comprised of a single metal or alloy (sometimes referred to as "through" wall cladding) which does not possess both optimum strength and resistance to corrosion. Alternative constructions to single or through wall cladding for use as nuclear fuel rod cladding includes two layer or multiple layer tubing. These types of cladding have (a) an outer layer of a highly corrosion resistant alloy and (b) an inner layer that provides the bulk of the mechanical strength of the cladding. Cladding of this type, sometimes referred to as duplex cladding, with an extra low tin Zircaloy-type outer layer (nominally 0.8 wt. % tin) and a Zircaloy-4 inner layer is currently in use for nuclear fuel rod cladding. Zircaloy-4 inner layer cladding with a thin outer layer (3 to 5 mil) of various other corrosion resistant alloys has been produced and tested in-reactor. An outer layer alloy containing 0.5 wt. % tin, 0.5 wt. % iron, balance zirconium, and another outer layer alloy containing 0.5 wt. % tin, 0.5 wt. % iron, 0.2 wt. % chromium, balance zirconium have each shown exceptional corrosion performance in a high temperature pressurized water reactor. Examples of multiple layered tubing constructions and alloys for nuclear fuel rods are discussed in U.S. Pat. Nos. 5,493,592; 4,963,316; 4,735,768, which are each hereby incorporated by reference.

With the higher burnups and longer in-reactor residence times that are being pursued and which, for largely economic reasons, continue to be increased, performance limits of commonly used alloys for nuclear fuel rod cladding are being reached. The corrosion resistance of the Zircaloys has been a major concern, especially in modern high coolant temperature pressurized water reactors that employ low leakage core loadings where the corrosion film on Zircaloy can build up to unacceptable levels for burnups around 50 to 60 MWd/kgU. In efforts to optimize the corrosion performance of the Zircaloys, through a reduction in the tin level, the strength and creep properties of the cladding material have thereby been diminished. For example, over the last decade the tin level of the Zircaloys used as cladding materials in nuclear fuel rods which was nominally held at approximately 1.55 wt. % has been lowered to a nominal level of approximately 1.30 wt. %. This reduction in the level of tin has resulted in substantially better corrosion performance specifically at higher burnups, but the reduction in tin has negatively impacted the mechanical properties of the cladding. Tin is a solute solution strengthening alloy element in Zircaloy and improves the strength and creep resistance of the alloy. However, lowering the tin level in Zircaloy reduces the resistance of the cladding to creepdown as well as the strength of the cladding.

In attempts to overcome the limitations in the higher burnup performance of the zirconium alloys and the Zircaloys, alloy development programs have been initiated and research and development continue to this date for zirconium alloys for use as a nuclear fuel rod cladding that would have a more favorable combination of corrosion resistance, high strength and creep resistance as well as a low neutron cross section.

An object of the present invention is to improve upon the nuclear fuel rod claddings produced to date by using (I) an alloy for the outer layer of a multiple layered cladding tube with exceptional in-reactor corrosion characteristics and in accordance with the present invention to utilize (II) a new alloy for the inner part of the cladding that is of substantially higher strength than Zircaloy-2 or Zircaloy-4, while maintaining low parasitic neutron absorption characteristics of the latter alloys.

By using such a higher strength alloy for an inner layer of a multiple layer cladding tube, the overall cladding tube wall thickness can be reduced while still meeting the mechanical design and performance criteria of the fuel rod. By being able to reduce the cladding wall thickness, the cladding weight per unit length of cladding can be reduced and the cost of a cladding tube of a given length is reduced since less material is needed for the production of the cladding. Furthermore, by being able to reduce the cladding wall thickness, improvements in fuel cycle costs resulting from a reduction in the parasitic thermal neutron absorption can be obtained since parasitic neutron absorption for cladding of a given composition is directly proportional to the cladding wall thickness. Alloying elements with a smaller thermal neutron cross section than currently employed tin or niobium additions can reduce the parasitic neutron absorption of the alloy even further and gain additional improvements in fuel cycle costs.

By using such a higher strength alloy for an inner layer of the multiple layer cladding, significant energy production cost savings can also be obtained by reducing cladding wall thickness and increasing fuel rod fissionable material weight which is achieved by being able to use larger diameter fuel pellets while maintaining a constant fuel rod outer diameter. For a given fuel rod design, the outer diameter of the cladding is primarily determined by thermal hydraulic considerations and therefore cannot readily be changed. Thin wall cladding can accommodate larger diameter fuel pellets than a thicker wall cladding of the same outside diameter. A larger diameter fuel pellet can have a lower uranium enrichment than a smaller diameter pellet to produce the same amount of energy. For slightly enriched uranium dioxide nuclear fuel, the lifetime energy production of a unit length of fuel rod is proportional to the total number of $U^{235}$ atoms per unit length. Thus, for example, by using cladding with a 0.005 inch thinner wall than a thick wall design fuel rod containing 0.300 inch diameter pellets enriched to 4.00 wt. % $U^{235}$, fuel pellets of 0,310 inch diameter may be used. The reduced $U^{235}$ enrichment of these pellets would be $$\frac{\pi L(0.30)^2/4}{\pi L(0.31)^2/4} \times 4.00 \, w/o = 3.75 \, w/o \, U^{235}$$

(where L is a unit length of fuel) to maintain approximately the same number of $U^{235}$ atoms per unit length of fuel. Alternatively, by maintaining the same $U^{235}$ enrichment and increasing the pellet diameter, the number of $U^{235}$ atoms per unit length of fuel rod is increased and the lifetime energy production of a unit length of fuel would be increased as well. Either alternative would lead to reactor fuel cycle cost reductions by using relatively higher cost, but thin wall, multiple layer cladding compared to using thicker through wall Zircaloy cladding.

SUMMARY OF THE INVENTION

The present invention relates to high strength zirconium based alloys which contain bismuth and which, in one embodiment consists essentially of molybdenum and 3 to 6 weight percent bismuth, balance zirconium.

In another preferred embodiment, the high strength zirconium based alloy consists essentially of 1.5 to 6 weight percent bismuth and about 1 to 4 weight percent tin, the balance zirconium.

In another preferred embodiment, the high strength zirconium based alloy consists essentially of 1.5 to 3 weight percent bismuth, 0.5 to 3 weight percent niobium, 0.5 to 1.5 weight percent molybdenum, the balance zirconium, and where the sum of the amounts of niobium and molybdenum is greater than 1.5 weight percent.

DETAILED DESCRIPTION OF THE INVENTION

Figure 1:
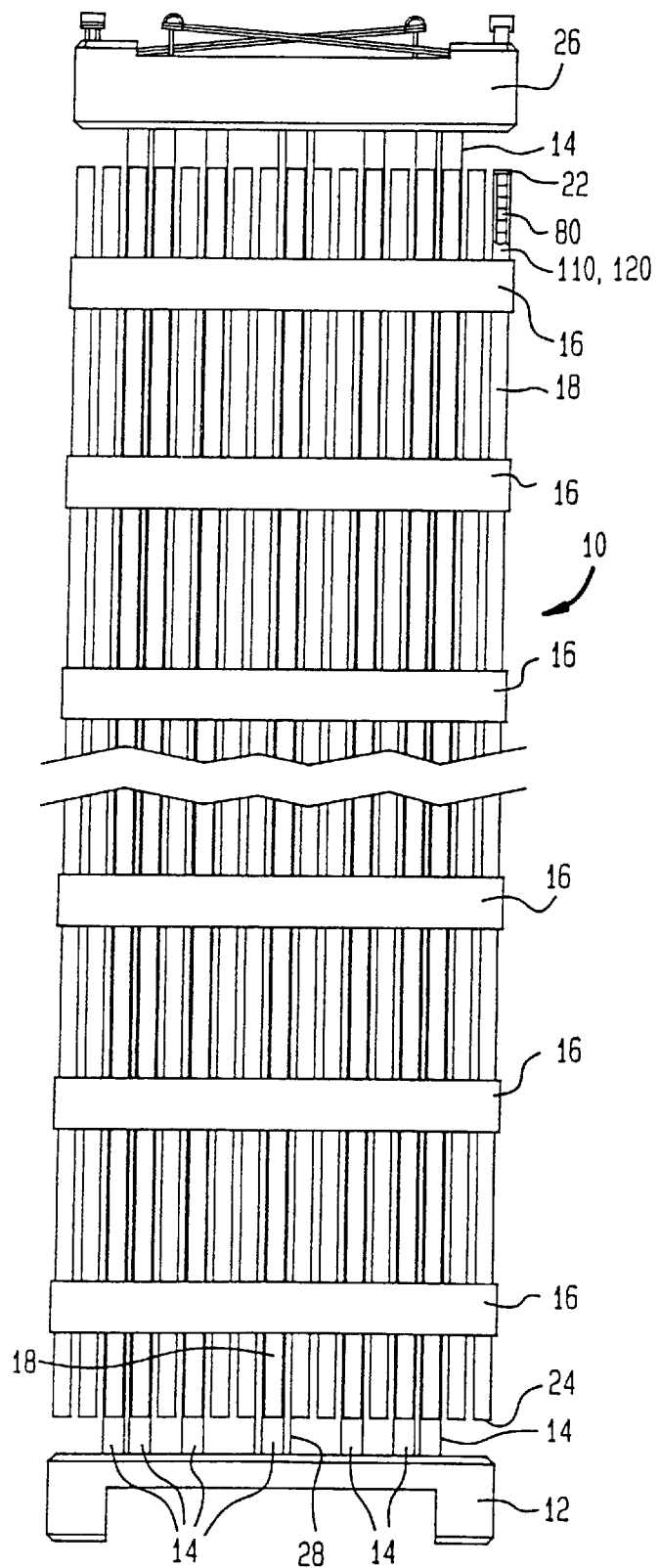
FIG. 1 is a side elevational view of a nuclear fuel assembly for a pressurized water reactor, the assembly being foreshortened in height.

Zircaloy-4 and Zircaloy-2 are much stronger and have much better creep resistance than unalloyed commercially pure zirconium. Zirconium alloys can typically be strengthened by two mechanisms; solid solution hardening and precipitation hardening. A combination of these strengthening mechanisms is employed in many high strength zirconium alloys. The most prominent precipitation strengthener is niobium. It is among others used in the Russian developed zirconium alloys having 1% niobium, 1.2% tin, 0.4% iron, and in the zirconium 2.5%–2.8% niobium alloy used in Canada for CANDU pressure tubes. Other precipitation strengtheners are molybdenum and silicon. The strength of Zircaloy-4 and Zircaloy-2 derive mainly from the addition of tin which, because of its solubility in the zirconium matrix, is a solid solution strengthener. The atomic radius of tin, 0.1584 nm, is nearly the same as that of zirconium, 0.1602 nm, and tin atoms take the place of or substitute for zirconium atoms in the crystallographic lattice of the alloy. Tin, therefore, is also called a substitutional alloying element when used in zirconium base alloys. The addition of iron and chromium to Zircaloy-4 and iron, chromium and nickel to Zircaloy-2 does not substantially affect the mechanical properties of these alloys since these elements are nearly insoluble in the zirconium alpha phase and are added in small amounts only. These alloy elements are added mainly to improve the corrosion behavior of the Zircaloys. At reactor operating temperatures and below, these transitional elements are present in the form of small intermetallic particles with the approximate compositions $Zr(CrFe)_2$ or $Zr_2(NiFe)$.

It has been determined in the present invention that the addition of certain alloying elements to zirconium produces alloys possessing improved strength and creep resistance. More particularly, the addition of bismuth making up about 1.5 to 6 weight percent and an element or mixtures of elements selected from the group consisting of molybdenum, tin and niobium, making up about 1 to 4 weight percent tin, 0.5 to 3 weight percent niobium and/or 0.5 to 1.5 weight percent molybdenum, the balance being zirconium, produces alloys which possess substantial improvement in strength and creep resistance.

In accordance with the present invention, alloys for use as the inner layer of two layered cladding tube or an inner layer of a three or more layered cladding tube having high strength and improved creep behavior as well as reduced parasitic neutron absorption comprise zirconium with an addition of from 1.5 to 6 weight percent bismuth (Bi). Similar to tin, bismuth is a solid solution strengthener. The atomic radius of bismuth is 0.1700 nm compared to the atomic radius of zirconium which is 0.1602 nm. This makes bismuth a substitutional alloying element similar to tin. The added advantage of using bismuth as an alloying element is its very low thermal neutron cross section; 0.034 barns compared to zirconium with a cross section of 0.184 barns. The thermal neutron cross section of tin is 0.610 barns. Whereas the addition of tin to zirconium increases the parasitic neutron absorption of the alloy over that of pure zirconium metal, the addition of bismuth lowers the parasitic neutron absorption by the alloy compared to either zirconium metal or to Zircaloy.

The following zirconium alloys with concentration levels of alloying elements have higher yield strength and creep resistance than Zircaloy and zirconium.

I. Ternary Alloys
   a. Zirconium-Bismuth-Molybdenum alloys with 3–6 weight percent Bismuth, and Molybdenum, balance Zirconium. Preferably 0.5 to 1.5 weight percent Molybdenum
   b. Zirconium-Bismuth-Tin alloys with 1–4 weight percent Tin and 1.5–6 weight percent Bismuth, balance Zirconium II. Quarternary Alloys
   a. Zirconium-Bismuth-Molybdenum-Niobium alloys with
      (A) 3–6 weight percent Bismuth, and Molybdenum and Niobium, balance Zirconium, preferably 0.5–1.5 weight percent Molybdenum and 0.5–3 weight percent Niobium:
      and
      (B) 1.5–3 weight percent Bismuth, 0.5–3.0 weight percent Niobium and 0.5–1.5 weight percent Molybdenum, balance Zirconium where the sum of Molybdenum and Niobium is greater than 1.5 weight percent
   b. Zirconium-Bismuth-Molybdenum-Tin alloys with 1–4 weight percent Tin, 1.5–6 weight percent Bismuth, and Molybdenum, balance Zirconium preferably 0.5–1.5 weight percent Molybdenum III. Quinary Alloys
   a. Zirconium-Bismuth-Molybdenum-Tin-Niobium alloys with 1–4 weight percent Tin, 1.5–6 weight percent Bismuth, and Molybdenum and Niobium, balance Zirconium preferably 0.5–1.5 weight percent Molybdenum and 0.5–3 weight percent Niobium All the above alloys could furthermore contain up to approximately 0.1 weight percent silicon for added strength and grain refinement purposes. In a preferred embodiment, the minimum silicon content should be 0.008 weight percent (80 ppm). These alloys could also contain between approximately 0.008 and 0.02 weight percent (80 and 200 ppm) of carbon for grain size control. The oxygen level in the above alloys could be adjusted to fall in the range of 0.06 to 0.018 weight percent (600–1800 ppm) and preferably in the range of 0.06 to 0.09 weight percent (600–900 ppm) in order to impart low temperature strength to the alloys.

Referring to the drawings, FIG. 1 represents a nuclear fuel assembly 10 for a pressurized water reactor (PWR) comprising a lower tie plate 12, guide tubes 14, nuclear fuel rods 18 which are spaced radially and supported by spacer grids 16 spaced along the guide tubes, an instrumentation tube 28, and an upper tie plate 26 attached to the upper ends of the guide tubes. Control rods which are used to assist in controlling the fission reaction are disposed in the guide tubes during reactor operation, but are not shown. Each fuel rod 18 generally includes a metallic tubular fuel rod cladding 110 (120) within which are nuclear fuel pellets 80 composed of fissionable material and an upper end plug 22 and a lower end plug 24 which hermetically seal the nuclear fuel pellets within the metallic tubular fuel rod cladding. A helical spring member can be positioned within the fuel rod between upper end plug 22 and fuel pellet 80 to maintain the position of the fuel pellets in a stacked relationship.

Figure 2A:
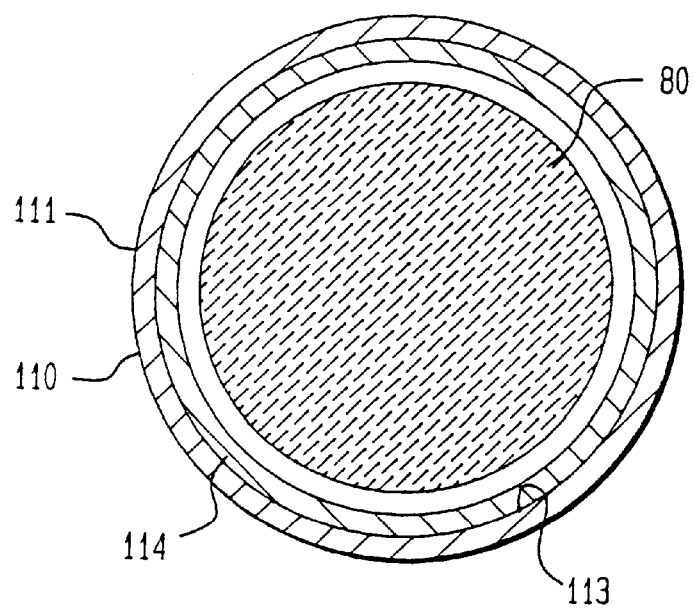
FIG. 2A is a schematic representation of a cross-sectional view of a nuclear fuel rod shown for example in the fuel assembly in FIG. 1 and having a composite duplex cladding comprising two layers.

Referring to FIG. 2A which is a schematic representation of a cross-sectional view of a nuclear fuel rod for a PWR such as shown in FIG. 1 constructed according to the teachings of the present invention having a composite cladding 110 comprising an outer layer 111 composed of a corrosion resistant zirconium and/or zirconium alloy metal and an inner layer 114 bonded metallurgically to inner wall 113 of outer layer 111 and composed a zirconium alloy consisting essentially of molybdenum and 3 to 6 weight percent bismuth and the balance zirconium, and preferably where the amount of molybdenum is in the range of 0.5 to 1.5 weight percent.

In another embodiment, the inner layer 114 is made from another zirconium alloy consisting essentially of molybdenum, niobium, and 3 to 6 weight percent bismuth and the balance zirconium, and preferably where the amount of molybdenum is in the range of 0.5 to 1.5 weight percent and the amount of niobium is in the range of 0.5 to 3 weight percent.

In another embodiment, inner layer 114 is composed of a zirconium alloy consisting essentially of 1.5 to 6 weight percent bismuth and 1 to 4 weight percent tin, the balance zirconium.

In another embodiment, inner layer 114 is composed of a zirconium alloy consisting essentially of molybdenum and 1.5 to 6 weight percent bismuth and 1 to 4 weight percent tin, the balance zirconium.

In another embodiment, inner layer 114 is composed of a zirconium alloy consisting essentially of molybdenum, niobium, and 1.5 to 6 weight percent bismuth and 1 to 4 weight percent tin, the balance zirconium, and preferably where the amount of molybdenum ranges from 0.5 to 1.5 weight percent and the amount of niobium ranges from 0.5 to 3 weight percent.

In another embodiment, inner layer is composed of a zirconium alloy consisting essentially of 1.5 to 3 weight percent bismuth, 0.5 to 3 weight percent niobium, 0.5 to 1.5 weight percent molybdenum, the balance zirconium, where the sum of the amounts of niobium and molybdenum is greater than 1.5 weight percent.

Figure 2B:
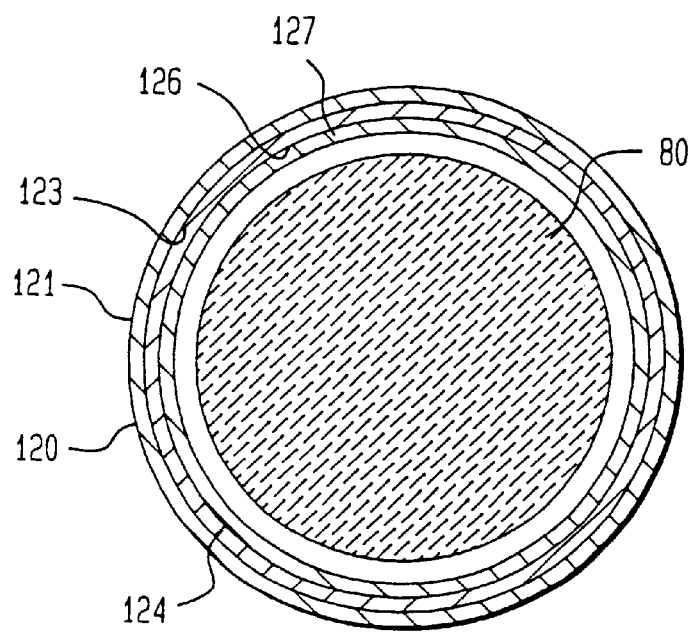
FIG. 2B is a schematic representation of a cross-sectional view of a nuclear fuel rod shown for example in the fuel assembly in FIG. 1 and having a composite triplex cladding comprising three layers.

Referring to FIG. 2B which is a schematic representation of a cross-sectional view of another nuclear fuel rod for a PWR such as shown in FIG. 1 constructed according to the teachings of the present invention having a composite cladding 120 comprising an outer layer 121 composed of a corrosion resistant zirconium and/or zirconium alloy metal, an inner layer 124 composed a high strength zirconium alloy and an innermost layer 127 or liner bonded metallurgically on the inside surface 26 of the inner layer 124.

In accordance with the present invention, inner layer 124 of composite cladding 120 is composed of a high strength zirconium alloy consisting essentially of molybdenum and 3 to 6 weight percent bismuth and the balance zirconium, and preferable where the amount of molybdenum is in the range of 0.5 to 1.5 weight percent.

In another embodiment, the inner layer 124 is made from another zirconium alloy consisting essentially of molybdenum, niobium, and 3 to 6 weight percent bismuth and the balance zirconium, and preferably where the amount of molybdenum is in the range of 0.5 to 1.5 weight percent and the amount of niobium is in the range of 0.5 to 3 weight percent.

In another embodiment, inner layer 124 is composed of a zirconium alloy consisting essentially of 1.5 to 6 weight percent bismuth and 1 to 4 weight percent tin, the balance zirconium.

In another embodiment, inner layer 124 is composed of a zirconium alloy consisting essentially of molybdenum and 1.5 to 6 weight percent bismuth and 1 to 4 weight percent tin, the balance zirconium.

In another embodiment, inner layer 124 is composed of a zirconium alloy consisting essentially of molybdenum, niobium, and 1.5 to 6 weight percent bismuth and 1 to 4 weight percent tin, the balance zirconium, and preferably where the amount of molybdenum ranges from 0.5 to 1.5 weight percent and the amount of niobium ranges from 0.5 to 3 weight percent.

In another embodiment, inner layer 124 is composed of a zirconium alloy consisting essentially of 1.5 to 3 weight percent bismuth, 0.5 to 3 weight percent niobium, 0.5 to 1.5 weight percent molybdenum, the balance zirconium, where the sum of the amounts of niobium and molybdenum is greater than 1.5 weight percent.

To provide additional protection against pellet cladding interactive (PCI) induced failures, innermost layer 124 can be zirconium or a zirconium alloy, or another metal and preferably is made of pure or sponge zirconium or a dilute zirconium iron alloy of about 0.4 weight percent iron.

While the foregoing description and drawings represent the preferred embodiments of the present invention, it will be apparent to those skilled in the art that various changes and modifications may be made therein without departing from the true spirit and scope of the present invention.

What is claimed is:

1. A high strength alloy of zirconium consisting essentially of greater than 2 to 6 weight percent bismuth and 1 to 4 weight percent tin, the balance zirconium.

2. The alloy as in claim 1 further consisting essentially of molybdenum.

3. The alloy as in claim 2 further consisting essentially of niobium.

4. The alloy as in claim 2 wherein the amount of molybdenum is in the range of 0.5 to 1.5 weight percent.

5. The alloy as in claim 3 wherein the amount of niobium is in the range of 0.5 to 3 weight percent.

6. The alloy as in claim 4 further including niobium in the range of 0.5 to 3 weight percent.

7. The alloy as in claim 6 further consisting essentially of up to 0.1 weight percent silicon.

8. A high strength alloy of zirconium consisting essentially of greater than 2.0 to 6 weight percent bismuth, 1 to 4 weight percent tin, 0.5 to 1.5 weight percent molybdenum, 0.5 to 3 weight percent niobium, further consisting essentially of silicon wherein the amount of silicon is in the range of 0.008 to 0.015 weight percent.

9. The alloy as in claim 3 further consisting essentially of carbon in the range of 0.008 to 0.02 weight percent.

10. The alloy as in claim 9 further consisting essentially of oxygen in the range of 0.06 to 0.18 weight percent.

11. The alloy as in claim 10 wherein the range of oxygen is 0.06 to 0.09 weight percent.

12. A high strength alloy of zirconium consisting essentially of greater than 2 to 6 weight percent bismuth and 1 to 4 weight percent tin and further consisting of molybdenum, the balance zirconium.

* * * * *